Patented Oct. 15, 1946

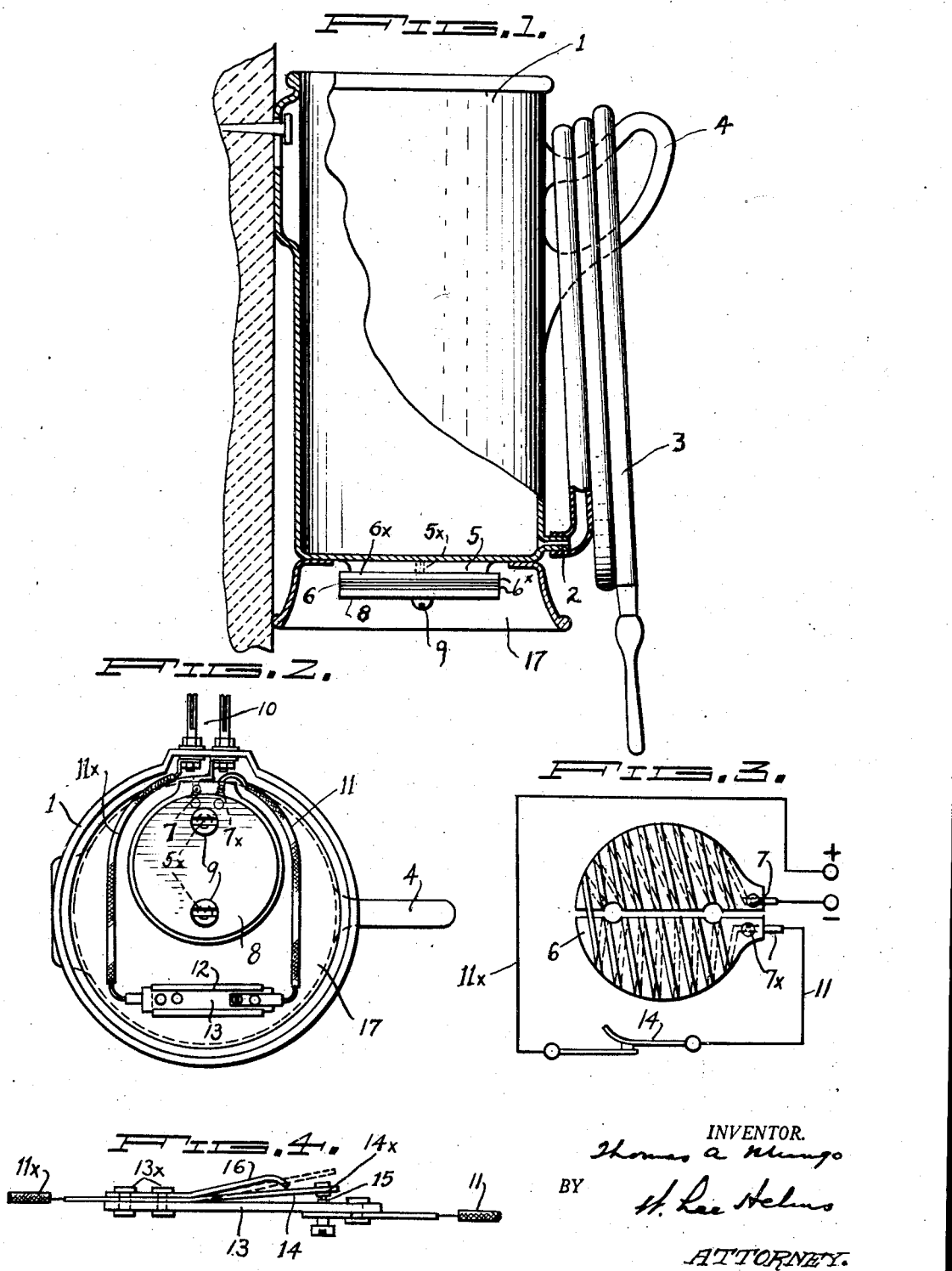

2,409,512

UNITED STATES PATENT OFFICE 2,409,512

CONTROLLED ELECTRIC WATER HEATER FOR HYGIENIC USE

Thomas A. Mungo, New York, N. Y.

Application October 31, 1944, Serial No. 561,965

1 Claim. (Cl. 219—38)

The object of the invention is to provide an electric water heater which will automatically break the heating circuit when the water reaches a predetermined temperature, say 100° F., when the water is intended for hygienic use, and which at the same time will constitute an improvement over the devices of the kind now in use, particularly in the relation of thermostatic control means to the container, so that the device will have long life and be of very low cost and simple in construction. In prior devices the thermostatic control means has generally been located within the water containing vessel so that it might be surrounded, or partially surrounded, by the water. Such means involves sealing and other problems, and substantially increases the cost of construction.

The characteristic of my controlled water heater is that it employs a thermostat device suspended outwardly from the metal base of the water containing vessel, and so related to the electro-thermo heating unit that the latter also may be carried by said base of the vessel and exterior thereto, the arrangement being very simple and being adaptable for various kinds and types of water heaters for hygienic use. I take advantage of the fact that as the heating of the metal base of the vessel proceeds, the water therein so progressively absorbs the heat that at a relatively short distance away from the electro-thermo heating element the water will have brought the temperature of such minor-distant metal area of the vessel bottom to a temperature only very slightly above the temperature of the water itself. Thus, by setting the thermostatic control element so that it will break the circuit when it reaches a temperature but several degrees above the temperature of the water, it is possible to mount the thermostatic element opposite and but a short distance away from the electro-thermo heating element, both being secured to and suspended from the base of the vessel.

The invention will be described with reference to the accompanying drawing, in which—

Figure 1 is a view in elevation showing an embodiment of the invention, and partly broken away.

Figure 2 is a bottom plan view of the structure shown in Figure 1.

Figure 3 is a wiring diagram, showing a detail of the heating element.

Figure 4 is a detailed view of the thermostat showing in dotted lines the circuit-breaking position.

Referring to the drawing, I have shown at 1 a suitable type of water heater for hygienic use, it being generally cylindrical in form and having an open top. Near the top of the vessel 1 the wall of the latter is formed with an outward depression which is apertured so that the vessel may be hung from a hook or the like to provide gravitational flow of the water or other liquid. At 2 I have shown an outlet nozzle to which may be secured a rubber tubing 3 leading to a syringe or other implement. The handle 4 may be so formed that the coil of the tubing 3 may be looped about the handle when the device is not in use. If desired a turn-valve device may be carried by the nozzle 2.

The electro-thermal element may be of any suitable form. That indicated in the drawing is desirable because of its simplicity. To the bottom of the vessel 1 may be secured, as by spot welding the round metal plate 5 which may be formed with two threaded apertures at 5x. Lying on the metal disk is a composite member consisting of a thin disk of insulation 6 carrying a resistance wire winding and two enclosing disks 6x of mica or other insulation. The ends of the resistance winding are secured by the hollow rivets 7, 7x. An exterior round metal plate 8 receives two screws 9 which pass through the resistance member and into the threaded apertures of plate 5.

A two prong plug device is shown at 10. One prong is electrically connected to one end of the resistance member at 7 and the second prong is connected to the other end of the resistance winding via wires 11, 11x and a thermostat specially positioned.

It will be seen that the thermostat consists of a metallic casing 12, which receives a rigid insulation member 13 on which is riveted at 13x a bi-metal thermostat arm 14 having a contact 14x. Contact 14x normally engages the end of a threaded stud 15 by means of which the timing of action of the thermostat is regulated. Thermostat arm 14 is given light pressure by leaf spring 16.

The metallic thermostat casing 12 is secured directly upon the bottom of the heating vessel 1 and it is opposite to, and spaced from, the heating element, although the spacing may be short and in some cases may be somewhat less than one inch.

At the base of the vessel 1 is employed a supporting annular skirt or ring 17, which may be apertured for air circulation. Legs or other supporting means may be substituted for the ring, if desired.

It will be understood that the specific form of the thermostat may be varied, as well as the form of the heating element, those illustrated being desirable because of simplicity and low cost.

Having described my invention, what I claim and desire to secure by Letters Patent, is as follows:

An electric water heater for hygienic use which consists of a metallic vessel having a closed bottom wall having an inner face directly receiving water when contained in the vessel, an electro-thermal heating member secured to the outside of and depending from said bottom wall and having terminals, a heat-conduction thermostat also secured to and depending from said bottom wall, there being a space of bottom wall between the heating element and the thermostat, conductor members for connection to a power line, one of said conductors being connected to one terminal of the electro-thermal heating member, the second terminal being connected to the thermostat and the thermostat being connected to the second conductor.

THOMAS A. MUNGO.